Aug. 8, 1944.　　　A. HOWARD　　　2,355,440
PIPING ARRANGEMENT
Filed Aug. 21, 1942
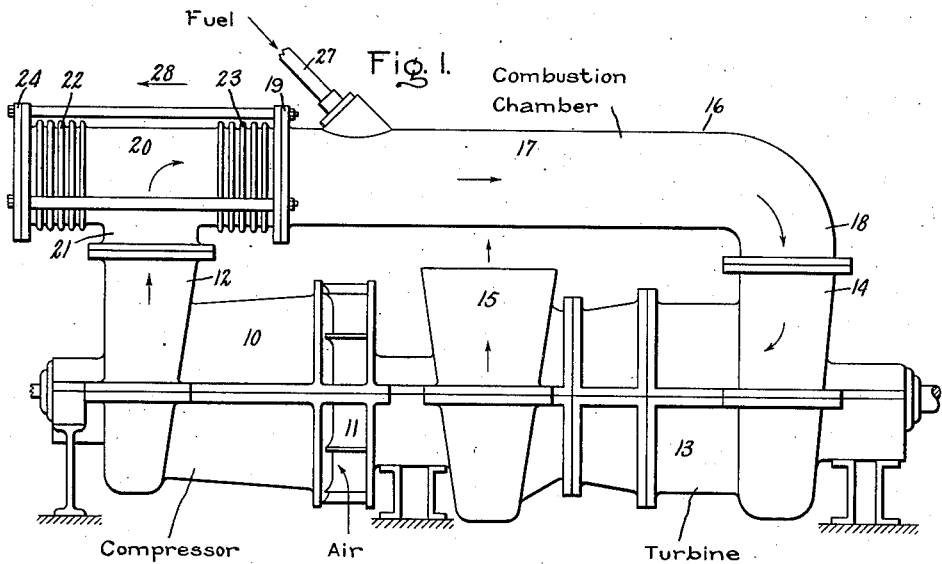
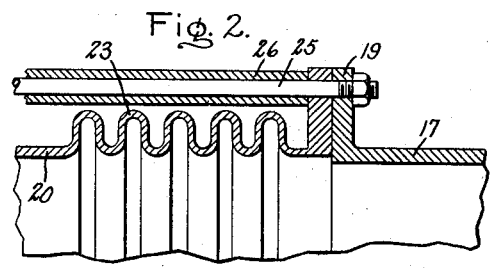
Inventor:
Alan Howard,
by Harry E. Dunham
His Attorney.

Patented Aug. 8, 1944

2,355,440

UNITED STATES PATENT OFFICE 2,355,440

PIPING ARRANGEMENT

Alan Howard, Schenectady, N. Y., assignor to General Electric Company, a corporation of New York Application August 21, 1942, Serial No. 455,665

2 Claims. (Cl. 285—90)

The present invention relates to piping arrangements as are used, for example, in elastic fluid turbine power plants for conducting elastic fluid to a turbine or like consumer. The piping in such plants is subjected to considerable force due to temperature expansion and internal pressure. Accordingly it is important to provide arrangements in which forces of expansion exerted on certain parts of the piping are not transmitted to machines and other elements to which the pipes or conduits are connected.

The general object of my invention is to provide an improved construction of piping whereby forces of expansion and internal pressure exerted on the piping are not transmitted to elements to which the piping is connected.

For a consideration of what I believe to be novel and my invention, attention is directed to the following description and the claims appended thereto in connection with the accompanying drawing.

In the drawing Fig. 1 illustrates an elastic fluid turbine power plant embodying my invention, and Fig. 2 is an enlarged detail view of a part of Fig. 1.

The arrangement comprises an axial flow, multi-stage compressor 10 having an inlet 11 for receiving air to be compressed and a flanged discharge conduit 12 through which compressed air is discharged. The compressor in the present instance is driven by a gas turbine 13 which has a flanged inlet conduit 14 for receiving gas or like operating medium and a discharge conduit 15 through which gases are exhausted. The gas for operating the turbine 13 is produced in a pressure combustion chamber in which fuel is burned with the compressed air discharged from the compressor. This present combustion chamber is formed in a piping arrangement 16 for connecting the discharge conduit 12 of the compressor with the inlet conduit 14 of the turbine 13. The piping or conduit arrangement 16 according to my invention comprises a horizontally disposed conduit 17 extending substantially across the compressor 10 and the turbine 13. The righthand end portion of the conduit 16 forms a flanged elbow 18 rigidly secured to and supported on the flanged inlet conduit 14 of the turbine.

The lefthand end portion of the conduit 17 is formed with a flange 19 and in accordance with my invention connected to the flanged discharge conduit 12 of the compressor by means including a T-connector having a top 20 and a leg 21. The leg 21 is flanged and rigidly secured to the compressor discharge conduit 12. Opposite ends of the top 20 of the T-connector are secured to expansible means such as flexible bellows 22 and 23 respectively. Each bellows has a flanged end. The righthand end of the bellows 23 is secured to the conduit flange 19 while the lefthand end of the bellows 22 is closed by an end plate 24. Thus, adjacent ends of the bellows 22 and 23 are secured to the ends of the top 20 of the T-connector. The ends of the bellows facing away from each other are held in fixed, spaced relationship by means of a plurality of circumferentially spaced bolts 25 and spacer means in the form of tubes 26 surrounding the bolts and rigidly held between the flange 19 and the end plate 24.

During operation compressed air discharged from the conduit 12 into the T-connector 20, 21 is passed therefrom into the conduit 17 in which the compressed air is mixed with fuel supplied through a pipe 27. The mixture is burned and the gas thus produced is conducted to the gas turbine 13. During operation the conduit or piping arrangement is subject to considerable temperature changes, causing expansion and contraction. In addition the pressure of the gases produced within and conducted through the piping would exert considerable horizontal force on the machines if only a single expansion joint was used. These forces and also the forces due to expansion of the piping with the arrangement above described are not transmitted to the discharge conduit 12 of the compressor. If, for example, due to expansion the conduit 17 moved towards the left, the bellows 22 expands and the bellows 23 collapses an equal amount, the total length of the top 20 of the T-connector and the two bellows as fixed by the spacer tubes 26 remaining substantially the same. The only force transmitted to the flange is the small force necessary to deflect the bellows. Likewise, a horizontal motion towards the righthand side of the conduit 17 causes expansion of the bellows 23 and an equal amount of collapsing of the bellows 22, the total length of the bellows 22, 23 and the top 20 of the T-connector remaining constant as before.

With a conventional single bellows the internal pressure would result in a large horizontal force on the compressor flange tending to move it to the left and an essentially equal force on the turbine flange tending to move it to the right. With the two bellows arrangement these forces balance each other through the spacer tubes and bolts 25 and 26 so that no force is transmitted to either flange.

Thus, with my invention I provide an improved construction of piping arrangements whereby forces created during operation due to relative expansion are not transmitted to machines or like elements to which the piping is connected. Broadly, a piping arrangement according to my invention includes two conduits 12 and 17 arranged at an angle to each other. The first conduit 17 is subject to considerable expansion and the second conduit 12 is subject to comparatively little expansion during operation. The two conduits according to the invention are connected by an arrangement which includes a conduit member 20 aligned with the first conduit 17 and having an intermediate portion connected to the second conduit 12.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination of a T-connector having a leg and a top communicating with the leg, two bellows connected to opposite ends of the top, an end plate closing the free end of one bellows, and a plurality of circumferentially spaced rods each having an end rigidly secured to said end plate and another end secured to the free end of the other bellows to maintain the total length of the top and the two bellows substantially constant.

2. The combination of a first conduit subject to considerable expansion during operation, a second conduit arranged at an angle to the first conduit and subject to comparatively little expansion during operation, and an arrangement for connecting the first and second conduits comprising a conduit member in alignment with the first conduit and having an intermediate portion connected to the second conduit, two bellows in alignment with the first conduit, one bellows connecting the conduit member to the first conduit and forming a passage between the first conduit and the conduit member, the other bellows having a closed end and being connected to the free end of the conduit member and means rigidly connecting the opposite end portions of the bellows.

ALAN HOWARD.